United States Patent [19]

Vock et al.

[11] Patent Number: 5,904,726
[45] Date of Patent: May 18, 1999

[54] ACCELEROMETER-BASED GOLF DISTANCING APPARATUS

[75] Inventors: Curtis A. Vock, Salem; Dennis Darcy, Dracut, both of Mass.

[73] Assignee: Golf Age Technologies Partnership, Jamaica Plain, Mass.

[21] Appl. No.: 08/447,617

[22] Filed: May 23, 1995

Related U.S. Application Data

[63] Continuation-in-part of application No. 08/183,594, Jan. 19, 1994, Pat. No. 5,438,518.

[51] Int. Cl.$^6$ .............................. G01S 5/14; A63B 71/06; A63B 57/00
[52] U.S. Cl. ........................................... 701/208; 701/300
[58] Field of Search .................................... 364/449, 460, 364/559, 410, 444, 453, 561, 450, 449.2, 449.1, 444.1; 73/514.01, 514.02; 701/208, 207, 201, 300, 220, 217

[56] References Cited

U.S. PATENT DOCUMENTS

| | | | |
|---|---|---|---|
| 3,805,411 | 4/1974 | Andrews, Jr. ............................... | 35/7 R |
| 4,266,214 | 5/1981 | Peters, Jr. ............................... | 340/323 R |
| 4,297,701 | 10/1981 | Henriques ........................... | 343/6.5 LC |
| 4,321,678 | 3/1982 | Krogmann ............................... | 364/453 |
| 4,367,526 | 1/1983 | McGeary et al. ......................... | 364/411 |
| 4,480,310 | 10/1984 | Alvarez .................................... | 364/450 |
| 4,547,781 | 10/1985 | Gelhorn et al. ........................ | 346/33 R |
| 4,655,451 | 4/1987 | Townsley ............................... | 273/32 H |
| 4,665,404 | 5/1987 | Christy et al. ........................... | 342/463 |
| 4,698,781 | 10/1987 | Cockerell, Jr. ........................... | 364/561 |
| 4,703,444 | 10/1987 | Storms, Jr. et al. ..................... | 364/561 |
| 4,731,613 | 3/1988 | Endo et al. ............................... | 342/357 |
| 4,815,020 | 3/1989 | Cormier .............................. | 364/709.11 |
| 4,839,838 | 6/1989 | LaBiche et al. ..................... | 364/709.11 |
| 4,864,592 | 9/1989 | Lee .............................................. | 377/5 |
| 4,879,658 | 11/1989 | Takashima et al. ..................... | 364/449 |
| 4,887,281 | 12/1989 | Swanson ................................. | 377/24.1 |
| 4,910,677 | 3/1990 | Remedio et al. ......................... | 364/410 |
| 4,922,444 | 5/1990 | Baba ......................................... | 364/566 |
| 5,044,634 | 9/1991 | Dudley ................................... | 273/32 R |
| 5,056,106 | 10/1991 | Wang et al. ................................ | 375/1 |
| 5,058,023 | 10/1991 | Kozikaro ................................. | 364/450 |
| 5,214,679 | 5/1993 | Metcalf .................................... | 377/5 |
| 5,225,842 | 7/1993 | Brown et al. ........................... | 342/357 |
| 5,245,537 | 9/1993 | Barber .................................... | 364/410 |
| 5,319,548 | 6/1994 | Germain ................................. | 364/410 |
| 5,364,093 | 11/1994 | Huston et al. ......................... | 273/32 R |
| 5,440,492 | 8/1995 | Kozah et al. ........................... | 364/454 |
| 5,507,485 | 4/1996 | Fisher ..................................... | 364/410 |
| 5,615,132 | 3/1997 | Horton et al. .......................... | 364/516 |

OTHER PUBLICATIONS

Julpe, "You're never out of range of the master—Sahara unveils computerized 'caddy'", *Sahara Country Club Sports*, Las Vegas Sun (undated).

Carey, "Sextants in Space Can Change the World" Wall Street Journal (1993).

Webster, "Device hastens flood aid", The Arizona Republic, pp. B4–B5 (Sep. 7, 1993).

(List continued on next page.)

*Primary Examiner*—Michael Zanelli
*Attorney, Agent, or Firm*—Duft, Graziano & Forest, P.C.; Curtis A. Vock, Esq.

[57] ABSTRACT

A portable distance tracking device calculates the distance to a flag from a first position on a hole of a golf course. An initialization means initializes the device at the start of play. The device includes two rotational accelerometers, to measure acceleration along pitch and roll axes, and a translational accelerometer, to measure acceleration along a surge axis. A microprocessor, including an A-D converter, (i) converts the accelerations to digital data and (ii) integrates the data twice, over time, to determine distance traveled on the hole. The microprocessor further compensates the data for forces due to at least one of gravity, centripetal acceleration, and a rotation of earth, and thereafter determines the distance to the flag as a function of the distance traveled. A keypad input device provides for selecting the initialization and for selecting the hole in play. A memory element stores a digital representation of the hole; and a display unit displays the distance to the flag.

7 Claims, 14 Drawing Sheets

OTHER PUBLICATIONS

Chien, (Illustration by Dimare) "You Are Here", Popular Mechanics, pp. 50–52 (Nov. 1993).

Robinson, *Abstract* "Using Bus Level IRIG Time Code Translators To Time Tag Data And Synchronize Multiple Processing Stations" (undated).

Freeman, "Physical Engineering", Popular Mechanics, pp. 33–35 (Dec. 1993).

Cannon et al., "Testing a Lightweight GPS/GIS Terminal for Sub–Meter DGPS Positioning", ION GPS93, Salt Lake City (Sep. 22–24, 1993).

Ellowitz, "The Global Positioning System", Microwave Journal, pp. 24–33 (Apr. 1992).

Ardö et al., "On the accuracy of the global positioning system—A test using a hand–held receiver", 13 INT. J. Remote Sensing, 3229–3233 (1992).

Gibbons, "The Global Positioning System as a Complementary Tool for Remote Sensing and other Applications", 58 Photogrammetric Eng. & Remote Sensing, 1255–1257 (Aug. 1992).

Soler et al., "Accurate Determination of Cartesian Coordinates at Geodetic Stations Using the Global Positioning System", 19 Geophys. Res. Letters, 533–536 (Mar. 20, 1992).

Horiai, "Accuracy of time comparison derived from reception of LORAN–C and Global Positioning System time signals", 27 Radio Sci., 545–551 (Sep.–Oct. 1992).

Wassef et al,. "An Investigation into the Integrity of Surveying With the Global Positioning System (GPS)", 14 J. Geodynamics, 51–58 (1991).

Publication "Sensor Markets and Technologies Update: Riegl USA Senses Pulse of Laser Rangefinder Market", Vital Information Publications (Monday, Nov. 15, 1993).

Gething, "Radio Direction Finding and Superresolution", Peter Peregrinus Ltd. on behalf of the Institution of Electrical Engineers, Chapters 1–3, 5, and p. 1 of Chapter 7 (undated).

Motorola GeoResearch, Inc. product information sheet "GeoLink Mapping System® Live Map™ " (undated).

Motorola brochure "LGT 1000™ Terminal Lightweight GPS/GIS Terminal"(Mar. 1993).

Motorola brochure "SixGun™ 6000 Series DGPS Receivers and DGPS Systems" (1993).

Datum, Inc. data information sheet "bc637VME/bc357VXI GPS Satellite Receiver" (1991).

Datum, Inc. data information sheet "bc627AT GPS Satellite Receiver" (1991).

Datum, Inc. data information sheet TYMSERVE™ 2000 LAN Time Server (1993).

RangeMaster™ Golf Enterprises product information sheet "A Yardage Based Course Management System" (undated).

RangeMaster™ Golf Enterprises product information sheet (undated).

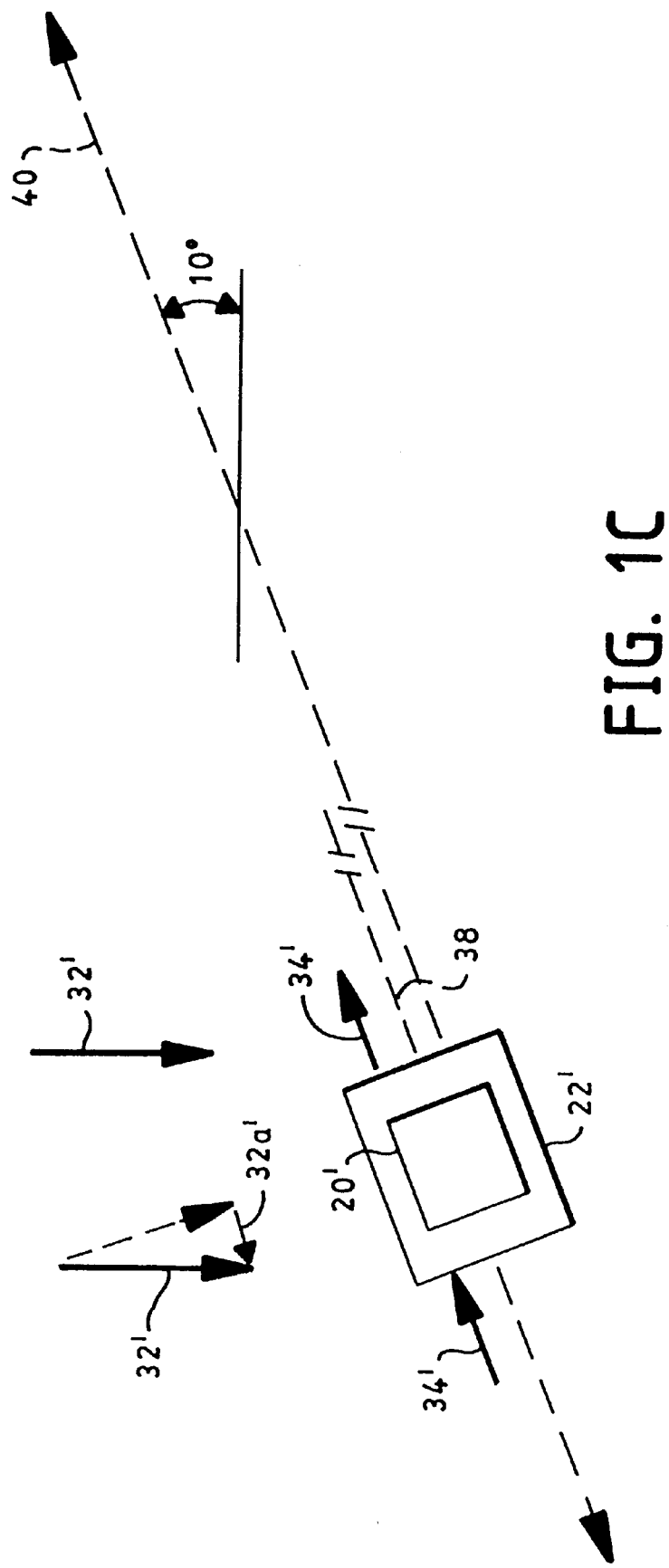

| i | Δt | ai | vi | di | 1/2atΛ2 | |
|---|---|---|---|---|---|---|
| 0 | 0 | 0 | 0 | 0 | 0 | INITIAL CONDITIONS |
| 1 | 0.1 | 10 | 1 | 0.05 | 0.05 | |
| 2 | 0.1 | 10 | 2 | 0.2 | 0.2 | |
| 3 | 0.1 | 10 | 3 | 0.45 | 0.45 | |
| 4 | 0.1 | 10 | 4 | 0.8 | 0.8 | |
| 5 | 0.1 | 10 | 5 | 1.25 | 1.25 | |
| 6 | 0.1 | 10 | 6 | 1.8 | 1.8 | |
| 7 | 0.1 | 10 | 7 | 2.45 | 2.45 | |
| 8 | 0.1 | 10 | 8 | 3.2 | 3.2 | |
| 9 | 0.1 | 10 | 9 | 4.05 | 4.05 | |
| 10 | 0.1 | 10 | 10 | 5 | 5 | |
| 11 | 0.1 | 10 | 11 | 6.05 | 6.05 | |
| 12 | 0.1 | 10 | 12 | 7.2 | 7.2 | |
| 13 | 0.1 | 10 | 13 | 8.45 | 8.45 | |
| 14 | 0.1 | 10 | 14 | 9.8 | 9.8 | |
| 15 | 0.1 | 10 | 15 | 11.25 | 11.25 | |
| 16 | 0.1 | 10 | 16 | 12.8 | 12.8 | |
| 17 | 0.1 | 10 | 17 | 14.45 | 14.45 | |
| 18 | 0.1 | 10 | 18 | 16.2 | 16.2 | |
| 19 | 0.1 | 10 | 19 | 18.05 | 18.05 | |
| 20 | 0.1 | 10 | 20 | 20 | 20 | |
| 21 | 0.1 | 10 | 21 | 22.05 | 22.05 | |
| 22 | 0.1 | 10 | 22 | 24.2 | 24.2 | |
| 23 | 0.1 | 10 | 23 | 26.45 | 26.45 | |
| 24 | 0.1 | 10 | 24 | 28.8 | 28.8 | |
| 25 | 0.1 | 10 | 25 | 31.25 | 31.25 | |
| 26 | 0.1 | 10 | 26 | 33.8 | 33.8 | |
| 27 | 0.1 | 10 | 27 | 36.45 | 36.45 | |
| 28 | 0.1 | 10 | 28 | 39.2 | 39.2 | |
| 29 | 0.1 | 10 | 29 | 42.05 | 42.05 | |
| 30 | 0.1 | 10 | 30 | 45 | 45 | |
| 31 | 0.1 | 10 | 31 | 48.05 | 48.05 | |
| 32 | 0.1 | 10 | 32 | 51.2 | 51.2 | |
| 33 | 0.1 | 10 | 33 | 54.45 | 54.45 | |
| 34 | 0.1 | 10 | 34 | 57.8 | 57.8 | |
| 35 | 0.1 | 10 | 35 | 61.25 | 61.25 | |
| 36 | 0.1 | 10 | 36 | 64.8 | 64.8 | |
| 37 | 0.1 | 10 | 37 | 68.45 | 68.45 | |
| 38 | 0.1 | 10 | 38 | 72.2 | 72.2 | |
| 39 | 0.1 | 10 | 39 | 76.05 | 76.05 | |
| 40 | 0.1 | 10 | 40 | 80 | 80 | |
| 41 | 0.1 | 10 | 41 | 84.05 | 84.05 | |
| 42 | 0.1 | 10 | 42 | 88.2 | 88.2 | |
| 43 | 0.1 | 10 | 43 | 92.45 | 92.45 | |

FIG. 10

| 44 | 0.1 | 10 | 44 | 96.8 | 96.8 | | |
|---|---|---|---|---|---|---|---|
| 45 | 0.1 | 10 | 45 | 101.25 | 101.25 | | |
| 46 | 0.1 | 10 | 46 | 105.8 | 105.8 | | |
| 47 | 0.1 | 10 | 47 | 110.45 | 110.45 | | |
| 48 | 0.1 | 10 | 48 | 115.2 | 115.2 | | |
| 49 | 0.1 | 10 | 49 | 120.05 | 120.05 | | |
| 50 | 0.1 | 10 | 50 | 125 | 125 | | |
| 51 | 0.1 | 10 | 51 | 130.05 | 130.05 | | |
| 52 | 0.1 | 10 | 52 | 135.2 | 135.2 | | |
| 53 | 0.1 | 10 | 53 | 140.45 | 140.45 | | |
| 54 | 0.1 | 10 | 54 | 145.8 | 145.8 | | |
| 55 | 0.1 | 10 | 55 | 151.25 | 151.25 | | |
| 56 | 0.1 | 10 | 56 | 156.8 | 156.8 | | |
| 57 | 0.1 | 10 | 57 | 162.45 | 162.45 | | |
| 58 | 0.1 | 10 | 58 | 168.2 | 168.2 | | |
| 59 | 0.1 | 10 | 59 | 174.05 | 174.05 | | |
| 60 | 0.1 | 10 | 60 | 180 | 180 | | |
| 61 | 0.1 | 10 | 61 | 186.05 | 186.05 | | |
| 62 | 0.1 | 10 | 62 | 192.2 | 192.2 | | |
| 63 | 0.1 | 10 | 63 | 198.45 | 198.45 | | |
| 64 | 0.1 | 10 | 64 | 204.8 | 204.8 | | |
| 65 | 0.1 | 10 | 65 | 211.25 | 211.25 | | |

FIG. 10A

ACCELEROMETER-BASED GOLF DISTANCING APPARATUS

RELATED APPLICATIONS

This application is a continuation-in-part of U.S. patent application Ser. No. 08/183,594, filed on Jan. 19, 1994, now U.S. Pat. No. 5,438,518 and which is expressly incorporated herein by reference.

BACKGROUND OF THE INVENTION

This invention relates generally to an electronic system for providing information to players on a playing field. More particularly, it relates to a system for determining the position of a golfer on a golf course and for communicating that position along with other relevant information to the golfer.

There are many thousands of golf courses in the United States and abroad, and tens of millions of people who play golf. Some people who play golf play regularly at the same course. However, quite often people playing at a course are unfamiliar with the course topography. Additionally, there is a growing number of visually impaired people who enjoy golfing. To accommodate these players, course operators provide maps, usually as part of a score card, which illustrates the layout of the course and indicates the distance from the tee to the flag for each hole. Additionally, the courses usually include distance markers, placed at various locations along the course. By way of example, at golf courses located in the United States, each hole typically includes a distance marker located along the fairway to indicate when a golfer is 150 yards from the flag.

In addition to such aids provided by golf courses, there are also a variety of prior art distancing and ranging devices. These devices also include systems for assisting a golfer's performance. The prior art systems typically include some mechanism for attempting to measure distances between a golfer and a variety of landmarks on a golf course. Such prior art devices employ a variety of methods to perform distance measurements. Some rely on visually siting the flag, while others require the flag to act as a receiver or transmitter of some sort. Other prior art systems rely on developing a coordinate system for the golf course and use linear accelerometers to track a golfers movement along the course. Yet other systems require the golf course to install tracking sensors below the fairway turf.

There are several drawbacks with regard to the present systems for informing golfers as to their position on a golf course. One such drawback is that the maps that are provided are usually very small (typically all eighteen holes are contained on a card that is less than 3"×5") and lack sufficient detail. By way of example, the maps often provide the distance from the tee to the flag and the general shape of the fairway, but fail to indicate the location of hazards such as accumulations of water and sand traps. Even when a course map depicts hazards, it virtually never provides distances to those hazards, nor does it typically provide other important distances, such as to the front of the green or to the back of the green. A further drawback is that the distance markers that the operators locate on the course are sometimes difficult to locate. Often small shrubs are used as distance markers. Other times, a small stake is located along the edge of the fairway. Still other times, a small metal or cement plate is placed in the ground. Because these distance markers are difficult to locate and the maps are very small, their usefulness is impeded for those who need them most: golfers who have never played the course and those golfers who are visually impaired. Another drawback is that the maps and markers which the course operators provide are often not up to date. As a golf season progresses, courses can become worn from over-use. Consequently, course operators periodically relocate the tees and the flags. As a result, the distance information provided by the maps and the markers is often inaccurate.

Another significant drawback is that, with the present system of score cards and accompanying map, it is difficult for a golfer to track historical information with regard to play at a particular course. By way of example, unless a golfer takes notes and saves old score cards, if a golfer only plays a course a few times each year, it is virtually impossible for the golfer to recollect performance on a particular hole. Consequently, even if the golfer encounters the same situation more than one time, each time is almost as if it is the first.

The more automated prior art systems also suffer from several disadvantages. Since the flag is not always visible, those systems that require siting the flag are not continuously operational. For example, if a player cannot see the flag, that player cannot use the system to determine distance. This situation can arise due to players forgetting to replace the flag or can be simply due to the topography of the course. Another disadvantage is that systems that require special tracking sensors to be installed can be very labor intensive and costly to maintain, not to mention disruptive to play during installation and maintenance. Further, other prior art electronic systems are typically complex and expensive in the methods employed to acquire positional information.

Yet another prior art golf measurement system utilizes accelerometers, such as the described in U.S. Pat. No. 5,245,537, entitled "Golf Distance Tracking, Club Selection, and Player Performance Statistics Apparatus and Method" by Andrew Barber. U.S. Pat. No. 5,245,537 is herein incorporated by reference. In general, this system attempts to determine the distance from the golf ball to the flag by keeping track of the accelerations experienced by the system after tee-off. This acceleration history is then used to quantify the distance traveled by the system toward the flag so that the distance traveled may be subtracted from the total yardage for the hole to determine yardage remaining to the flag. However, this accelerometer-based golf measurement system is prone to errors in determining the distance traveled because it does not compensate for several error sources, such as the force of gravity and forces of centripetal acceleration, which affect the system during travel.

It is, accordingly, an object of the invention to provide golfers with information regarding their distance to the flag.

Another object of the invention is to provide golfers with distance information, regarding their distance to the flag, which is based upon accelerometers and which is more accurate than existing golf measurement systems utilizing accelerometers.

Another object of the invention is to provide an accelerometer-based golf measurement system which minimizes the aforementioned difficulties associated with determining the distance traveled after tee-off, thereby improving the accuracy of determining the distance from the golf ball to the flag.

An additional object of the present invention is to provide golfers with information regarding distances to hazards on a golf course.

A further object of the invention is to provide golfers with accurate distance information on a golf course, regardless of the movement of the tees and the flags.

Another object of the present invention is to provide golfers with adaptive information regarding proper club selection.

Other general and specific objects of the invention will in part be obvious and will in part appear hereinafter.

SUMMARY OF THE INVENTION

The invention achieves the aforementioned objectives, and others, by providing a portable distance tracking system for use by a player on a playing field, such as a golf course. In accord with one aspect of the invention, the system includes at least three accelerometers, two rotational and one translational, which generate an output corresponding to the acceleration forces affecting the system and which are integrated twice over time to obtain velocity and then distance.

Distance measurement using accelerometers is affected by various error sources. An accelerometer is a device that produces a voltage that is proportional to an applied acceleration. There are two types of accelerometers, namely Linear and Angular. A linear accelerometer measures acceleration along a straight line. An angular measures an acceleration from a rotation. In order to measure distance traveled, according to the invention, (i) a linear accelerometer is used to determine translational acceleration, which is then double integrated over time; and (ii) an angular accelerometer is used correlate the number of turns a golf cart takes, which is then double integrated to determine direction.

The translational accelerometer will, however, have errors associated its measurement. These errors are due to two primary causes. The first is that when a the golf cart rotates, it causes the linear accelerometer to measure a centripetal acceleration. This acceleration is equal to the rotational velocity, ω, squared times the radius of rotation. This is true for the two degrees of rotation, pitch and yaw, if the linear accelerometer is placed along the surge axis. The other source of error is gravity. An accelerometer will measure the acceleration due to gravity because it is an inertial instrument in that an accelerometer measures the force required to keep a seismic mass in a fixed position, even though a force is acting upon it. Since the seismic mass is known, the acceleration is simply the force divided by the value of the mass. This force is applied across the mass irregardless of whether the body is accelerating due to a change in velocity (for a given a unit of time), or whether there is an applied gravitational force.

The error associated with gravity is severe. For example, the acceleration due to gravity experienced by an accelerometer on a cart going up a hill with a 10 degree incline would result in an error of about 278 feet in the period of 100 seconds, which is clearly more error than could possibly be tolerated by such a small incline. The invention compensates for these errors, as discussed below.

Along with gravity there is another acceleration that should be considered: the earth's axial rotation. Any object that is at rest on the earth's surface is moving in a circle whose radius is that of the earth's radius with a period of one solar day. The centripetal acceleration that results is greatest at the equator and is zero at the poles. The direction of this acceleration is normal to the circle of rotation.

The distance measurement system of the invention comprises two rotational accelerometers, to measure acceleration along the pitch and roll axes, and a translational accelerometer along the surge axis. The accelerometers are connected to a microprocessor which reads their values through an A-D converter. This microprocessor interfaces to a keypad input device, a display unit, as well as a memory unit which will record player specific information. In order to determine distance traveled, the acceleration is integrated over time to determine velocity. Velocity is then integrated to determine distance.

The two rotational accelerometers are integrated to determine angular velocity in two dimensions. This velocity is used to subtract out the centripetal components of the translational acceleration. The angular velocities are the integrated again in order to determine angular position in two dimensions. The angular position in yaw will give the heading of the vehicle so that direction of travel may be determined. The angular position in pitch can be calculated to determine the angle of incline. The angle of incline will determine how much acceleration on the translational sensor is due to gravity. The accelerometer along the surge axis is read and from it the centripetal accelerations are subtracted as well as the accelerations due to gravity. The result is a true acceleration in the forward direction. This acceleration is then integrated twice over time to determine distance traveled in a direction given by the yaw angle.

Specifically, the invention provides a portable distance tracking device that calculates the distance to a flag from a first position on a hole of a golf course. An initialization means initializes the device at the start of play (i.e., sets all integrated values to zero). The device includes two rotational accelerometers, to measure acceleration along pitch and roll axes, and a translational accelerometer, to measure acceleration along a surge axis. A microprocessor, including an A-D converter, (i) converts the accelerations to digital data and (ii) integrates the data twice, over time, to determine distance traveled on the hole. The microprocessor further compensates the data for forces due to at least one of gravity, centripetal acceleration, and a rotation of earth, and thereafter determines the distance to the flag as a function of the distance traveled. A keypad input device provides for selecting the initialization and for selecting the hole in play. A memory element stores a digital representation of the hole; and a display unit displays the distance to the flag.

BRIEF DESCRIPTION OF THE DRAWINGS

For a better understanding of the nature and objects of the invention, reference should be made to the following detailed description and the accompanying drawings, in which:

FIG. 1C illustrates the movement of an accelerometer-based system along one axis that is not perpendicular to the force of gravity, and the subsequent calculation of distance traveled by the system, in accord with the invention;

FIGS. 10 and 10A show tabular calculations of discrete time determinations of distance, in accord with the invention;

DETAILED DESCRIPTION

Figure 1:
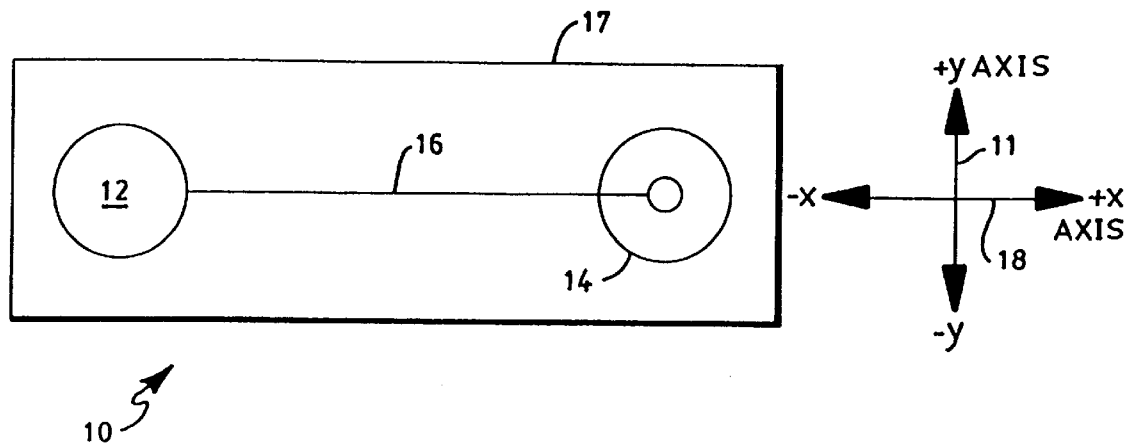
FIG. 1 shows a typical prior art translational accelerometer and which includes a seismic mass.

FIG. 1 illustrates a typical prior art linear (or translational) accelerometer 10 which produces a voltage that is substantially proportional to the acceleration forces affecting the accelerometer 10 along a predefined axis, here illustrated as the "y axis" 11. The accelerometer 10 generally includes an unbalanced mass 12, called a seismic mass, and a torquer 14, typically a motor unit, connected to the mass 12 via a moment arm 16.

An outer body 17 encloses the mass 12, torquer 14 and arm 16 and further contains other electro-mechanical components (not shown), known to those skilled in the art, which provide useful output information relating to the use of the accelerometer 10.

When the accelerometer 10 is forced to accelerate along the y axis 11 in the positive "up" direction, the mass 12 tends to move in the opposite direction, i.e., in the negative "down" direction along the y-axis 11. The torquer 14 senses this motion in the negative direction and applies a torque sufficient to keep the mass 12 at a fixed position. That is, the torque applied by the torquer 14 to the arm 16, and hence the seismic mass 12, is proportional to the applied acceleration which causes the accelerometer 10 to accelerate along the y-axis 11.

A signal representative of the torque applied by the torquer 14 is generated by the accelerometer 10 after the signal is normalized for the known mass of the seismic mass 12 and the length of the fixed moment arm 16. The signal is fed out of the body 17 for connection to various instrumentations which convert the signal to acceleration.

An acceleration along the x-axis 18 results in no movement of the mass 12; and, therefore, the accelerometer 10 does not produce an output signal corresponding to any movement in that axis.

There are many other types of accelerometers which provide a translational acceleration value by way of a proportional signal. These accelerometers typically utilize torquers, springs and the like, a movement mass, and feedback loops to determine acceleration.

One important class of prior art accelerometers includes those which utilize a piezoresistive element that is capable of measuring accelerations of 10,000 g. See McGraw-Hill *Encyclopedia of Science and Technology* 1994, under accelerometers, pages 37–44, incorporated herein by reference. For example, FIG. 1A shows an accelerometer 20 which includes a piezo-element 22, e.g., a piezoresistive or piezoelectric disk, a seismic mass 24 connected to the disk 22, and a bias clamp 26.

In operation, the piezo-element 22 comprises a crystal semiconductor which has a resistivity that changes with applied force. Thus, when the accelerometer 20 is subjected to acceleration along the axis 28, a signal from the piezo-element 22 is generated which corresponds to the forces affecting the piezo-element 22 and which can be converted into acceleration.

Figure 1A:
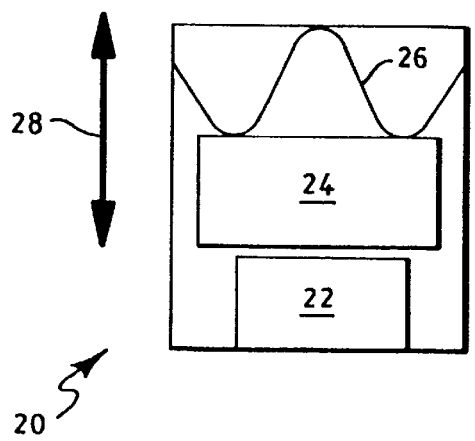
FIG. 1A shows a typical prior art translational accelerometer and which includes a piezo-element.

Each of the aforementioned translational accelerometers, like the accelerometer 10 of FIG. 1 and the accelerometer 20 of FIG. 1A, are subject to the acceleration force of gravity whenever there is any component vector of that gravity which coincides with the sensitive axis of the accelerometer. This acceleration due to gravity affects the signal generated by the accelerometer and, thereby, affects the determination of distance traveled along a given direction.

Figure 1B:
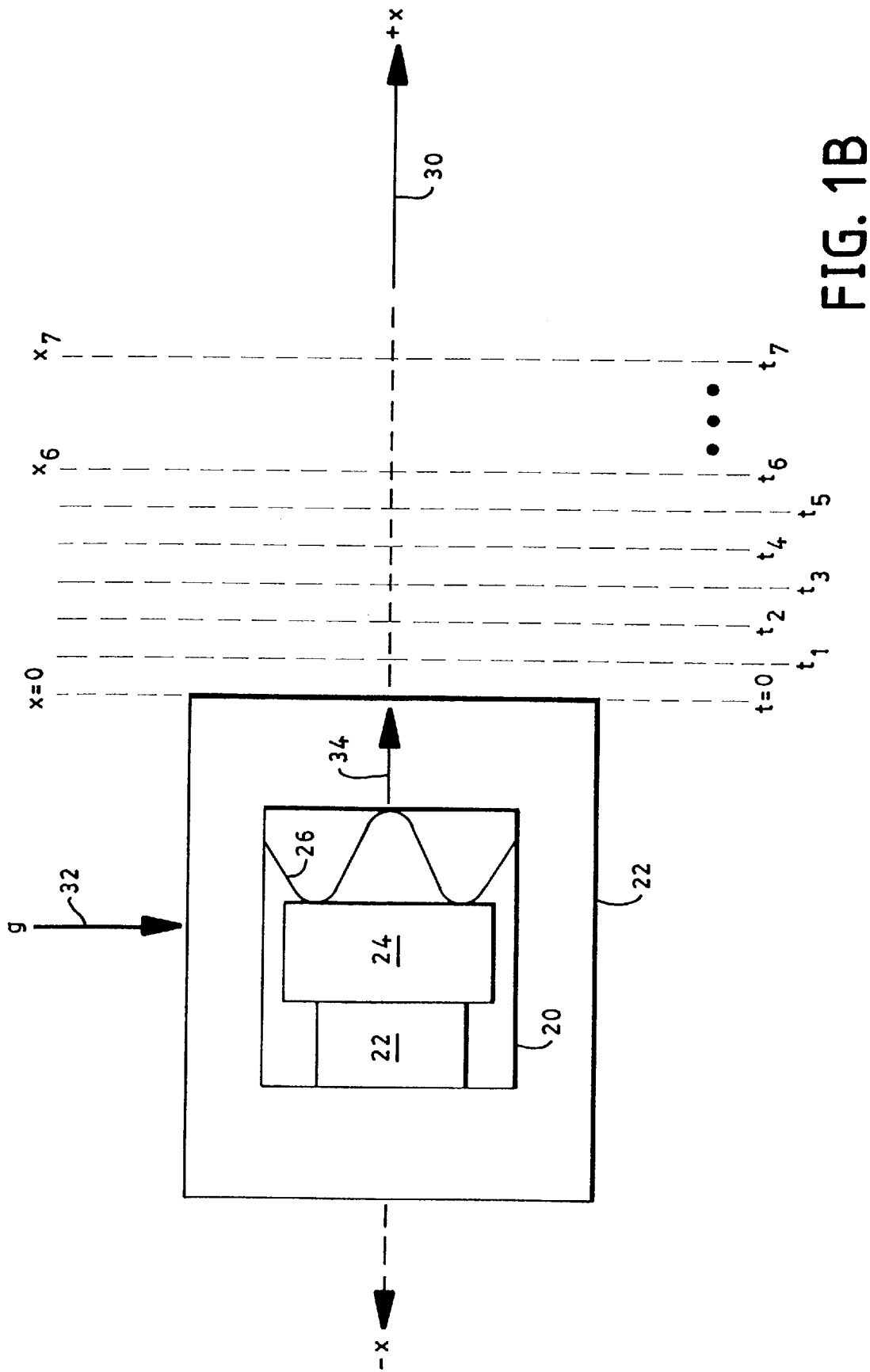
FIG. 1B illustrates the movement of an accelerometer-based system along one axis that is perpendicular to the force of gravity, and the subsequent calculation of distance traveled by the system, in accord with the invention.

Consider, for example, FIG. 1B, which illustrates the prior art accelerometer 20 of FIG. 1A incorporated into a system 22 that is accelerated along the x-axis 30 by a force 34. The system 22 converts the signal generated from the accelerometer 20 into a representative acceleration along the x-axis 30, and thereafter determines the distance traveled along the x-axis 30 by known mathematical techniques. In the example of FIG. 1B, a force of gravity 32 applies a constant force to the accelerometer that is perpendicular to the sensitive axis of the accelerometer, such as the axis 28 illustrated in FIG. 1A. The force of gravity 32 is also perpendicular to the acceleration forces 34 which cause the system 22 to move along the x-axis 30; and hence does not interfere with the calculation of distance traveled by the system 22.

Under the conditions of FIG. 1B, it is relatively straight-forward to calculate the distance traveled along the x-axis 30. If we assume that the system 22 accelerates from rest at a time t=0, and at a position x=0, and if we assume that the acceleration is approximately constant between each time t1, t2, t3 . . . (which is approximately achieved when the frequency of acceleration measurements is high as compared to the overall movement of the system 22 within the time period $\Delta t$), the distance traveled to location $x_n$, time $t_n$, is equal to $$\text{distance}(n) = \sum_{i=1}^{n} \left\{ (0.5)(a_i)(\Delta t)^2 + (\Delta t) \sum_{m=1}^{i-1} (a_m)(\Delta t) \right\}$$

where time (t) is equal to (n) ($\Delta t$), and where $\Delta t$ is the sampling time period.

Figure 8:
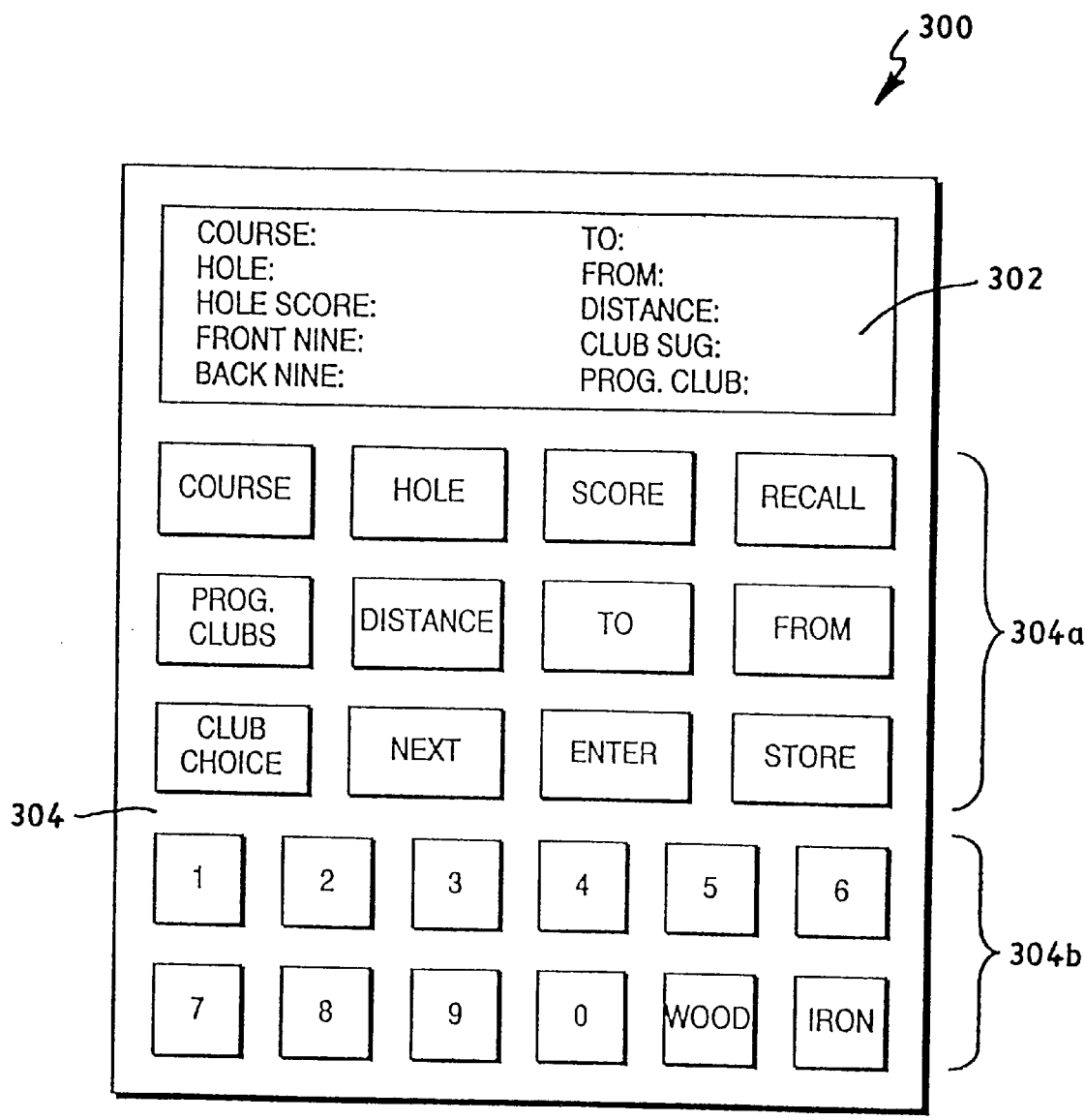
FIG. 8 depicts an alternative mobile interface unit according to the invention.
Figure 8A:
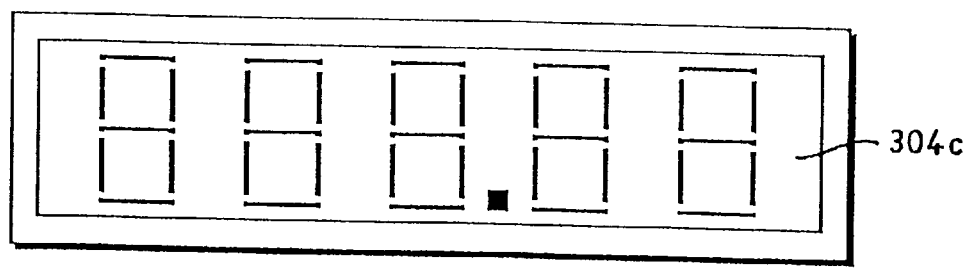
FIG. 8A depicts an alternative mobile interface unit according to the invention.
Figure 9:
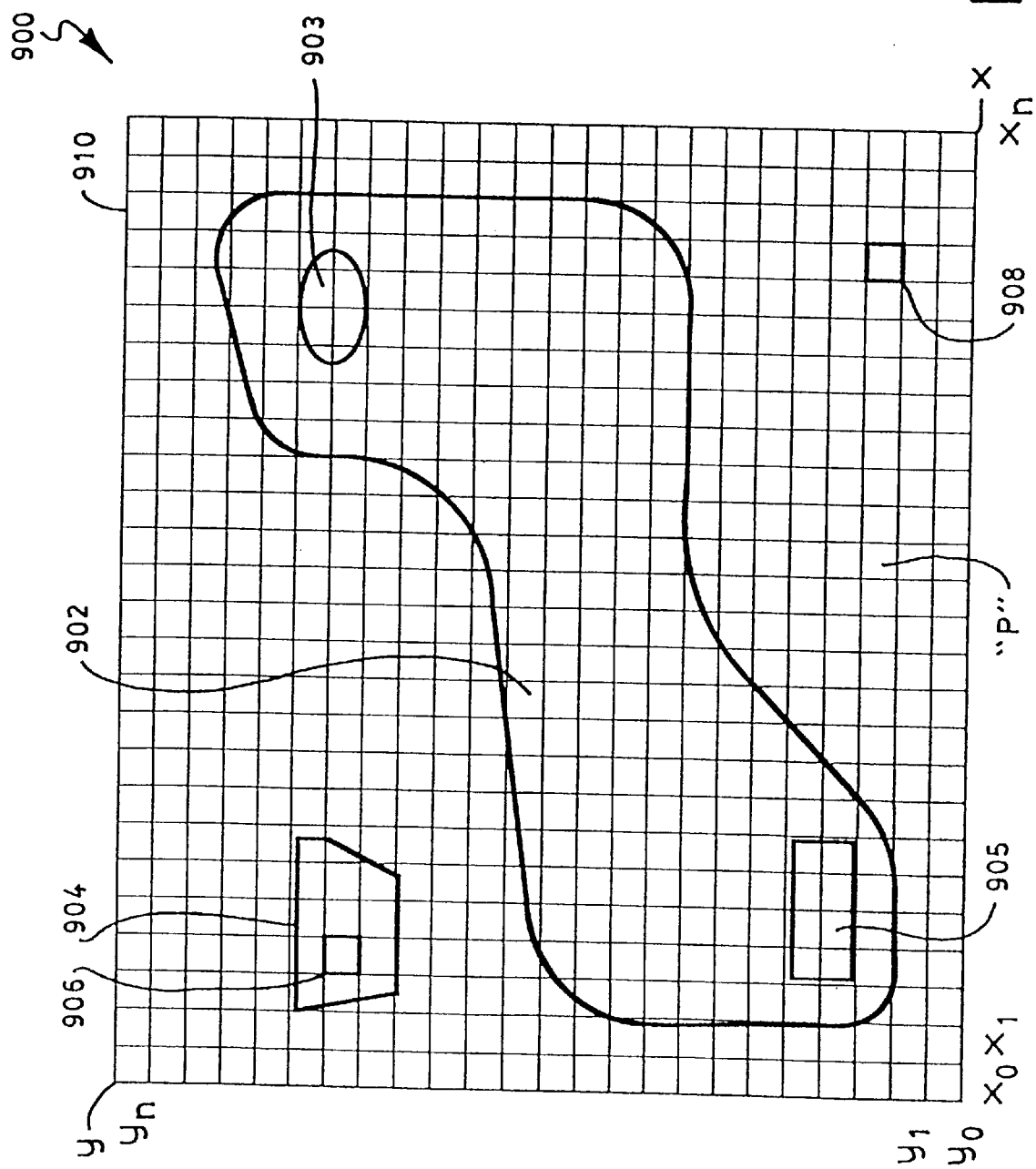
FIG. 9 illustrates one method of digitizing a playing field for storage in the memory unit of FIG. 5.

For example, if the system 22 is accelerated at a constant velocity of 10 cm/s^2 from position x=0, time t=0, and initial velocity of 0.0 cm/s for a period of six seconds, the distance traveled will be ½ a t^2, or (0.5) (10) (6)^2=180 cm. FIGS. 10 and 10A show tabular calculations of these quantities on a discrete time basis. Specifically, FIGS. 8 and 8A show how a system according to the invention can calculate integrated distance (di) by monitoring the acceleration motions (ai) at successive fixed moments in time (i), separated by $\Delta t$ time intervals (a frequency of 10 Hz).

The example of FIG. 1B is greatly complicated when the accelerometer 20 of FIG. 1B is aligned such that its sensitive axis is coaligned, to any degree, with the forces of gravity. Such a case is illustrated in FIG. 1C.

FIG. 1C shows a system 22', accelerated by forces 34', that is aligned such that the sensitive axis 38 of the accelerometer 20' is parallel to the movement of the system 22' along axis 40. Unlike FIG. 1B, however, the force of gravity 32' in FIG. 1C is not perpendicular to the axis 38. Accordingly, the system 22' "sees" the acceleration due to gravity; and any subsequent calculation of distance along axis 40 requires compensation to achieve accuracies needed in golf distancing.

The situation in FIG. 1C arises each time the dot product of the force of gravity vector 32' with the force vector 34' causing the motion of the system 22' is non-zero (i.e., two vectors which are perpendicular to each other have a zero dot product). In simple terms, such a situation occurs when the system 22' when the system 22 goes up a hill. The data corresponding to the accelerations detected by the accelerometer 20' is contaminated by the gravity force 32'. In fact, the accelerometer system 22' will register an acceleration even if there is no physical movement of the system 22'.

Consider a specific example of the situation illustrated in FIG. 1C wherein the system 22' is aligned and used to determine distance along the axis 40, and wherein the axis 40 is at a ten degree incline upwards. In such an example, the gravity vector 32' has a component vector 32a' which is parallel to the axis 40, and hence parallel to the sensitive axis 38 of the accelerometer 20'. The magnitude of the component vector 32a' is g * sin(10), and its sign is negative since its contribution is opposite to the motion-causing vector 34'.

Given the same conditions as set forth in FIG. 1B, i.e., a is 10 cm/s^2 and the time interval between successive measurements of a, is Δt=0.1 s, the resulting distance traveled in six seconds is significantly less than 180 cm.

The discussion of FIGS. 1–1C concerns only translational accelerometers. Another class of accelerometers, angular accelerometers, is also well-known. A body in motion is said to have angular acceleration if some fixed reference line between two points rotates or sweeps out an angle: hence it is clear that a body can move along a curved path without angular motion, such as the chairs on a ferris wheel. See McGraw-Hill *Encyclopedia of Science and Technology* 1994, pg. 39. Because angular acceleration and translational motion are related kinematically, it is possible to determine angular acceleration through the tangential components of translational acceleration.

Figure 1D:
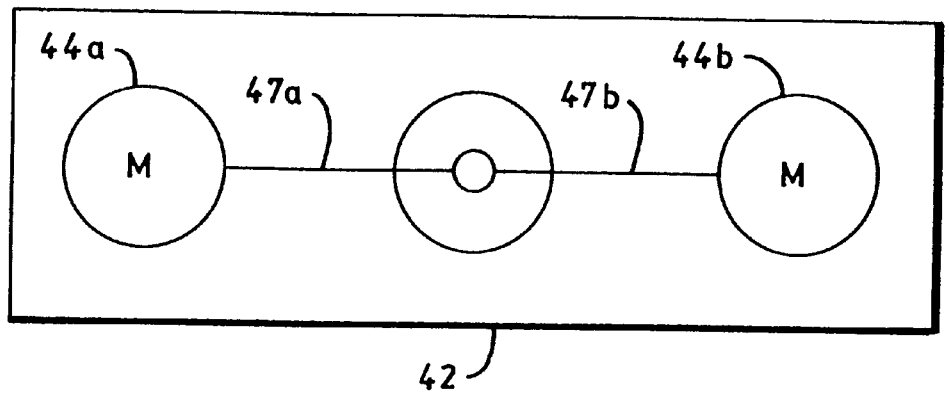
FIG. 1D shows a typical prior art rotational accelerometer and which includes a piezo-element.

A prior art angular, or "rotational", accelerometer 42 is illustrated in FIG. 1D. The rotational accelerometer 42 is similar to the translational accelerometer, e.g., the accelerometer 10 of FIG. 1, except that the seismic mass 44 is balanced with two masses 44a and 44b. These balanced masses help to assure that any acceleration acting in a straight line will not move the masses 44a, 44b since the resulting force will be equal and opposite. However, an angular acceleration will tend to force the masses 44a, 44b to move so that the torquer 46 must apply a torque to the two moment arms 47a, 47b to keep the masses 44a, 44b stationary. As before, this torque is proportional to acceleration; although in this context the torque is proportional to the applied angular acceleration.

Figure 2:
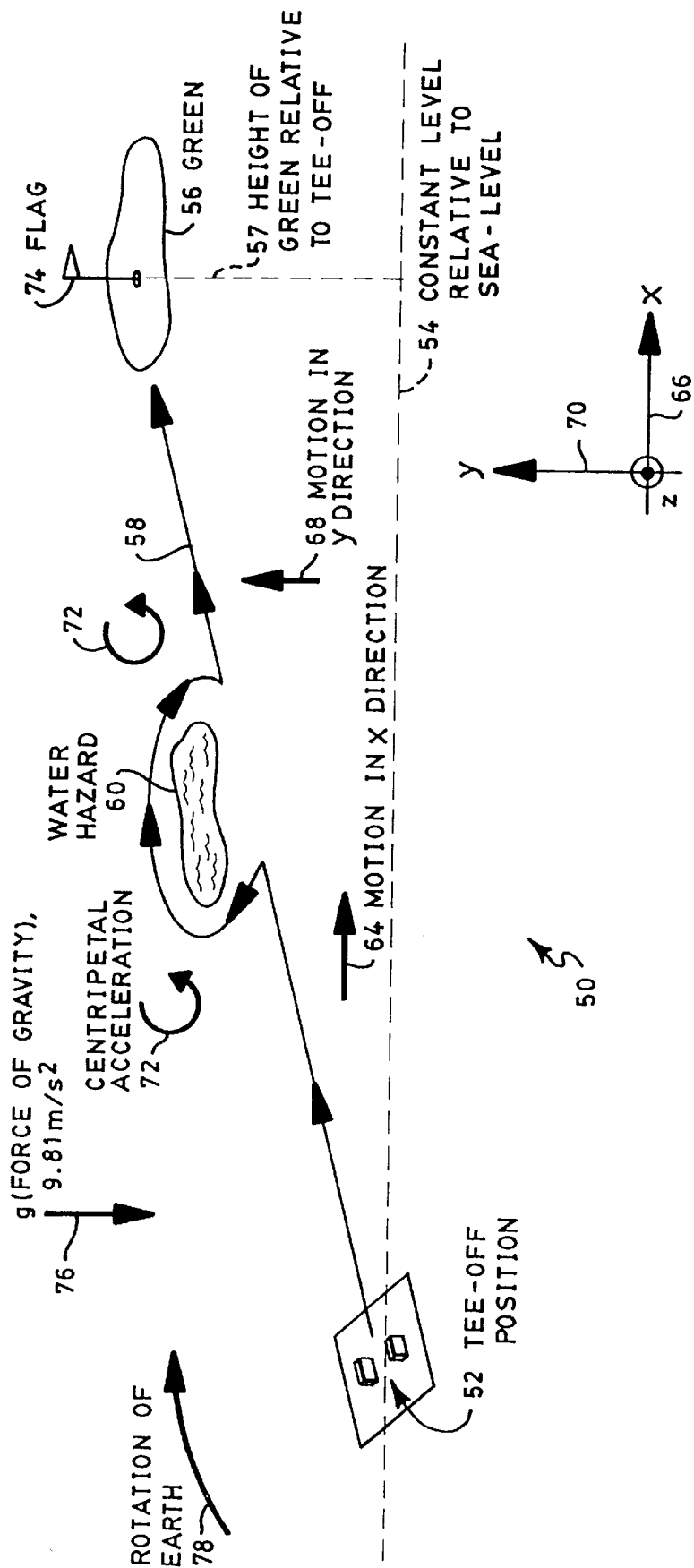
FIG. 2 illustrates several acceleration forces affecting the accelerometer-based golf positioning system during travel on a golf course and in accord with the invention.

FIG. 2 illustrates various forces affecting the accelerometer-based golf distancing system of the invention during a typical operative use of the invention: while being carried by a golfer on a golf course. For a typical hole 50, a golfer first positions himself at the tee-off position 52 at the beginning of the hole 50. For purposes of illustration, the tee-off position is at a first height 54 above sea level. The golfer then strives to reach the green 56 by successive swings, and hopefully connections, of the golf club with the golf ball. For illustrative purposes the green 56 is at a second height 57 above sea level. A typical track 58 that the golfer takes on the hole 50 includes, for example, the avoidance of the water hazard 60.

Most of the golfer's movement 64 that the golfer takes along path 58 is parallel to the x-axis 66. Therefore, the accelerometer-based golf distancing system of the invention must account for lateral displacement in at least one axis, e.g., the x-axis. However, because of the differing heights between the tee-off 52 and green 56, there is noticeable movement 68 by the golfer "up hill", i.e., a movement which is parallel to the axis 70. Therefore, the accelerometer-based golf distancing system of the invention must account for lateral displacement in at least one other axis, e.g., the y-axis.

Further, the movement of the golfer around the water hazard 60 has created centripetal acceleration 72. In normal, non-circular motions, a body which travels with constant velocity has no acceleration. However, a body moving in a circular path, or arc, has centripetal acceleration because the velocity is constantly changing; and that centripetal acceleration is toward the center of the circle. Accordingly, when the golfer travels path 58, and the golfer turns to avoid the hazard 60, a centripetal acceleration (of v^2/r, where v is velocity and r is radius) has most likely occurred, and should therefore be compensated for in the overall determination of distance between the golfer and the flag 74 on the green 56.

The force of gravity 76 is always present on earth; and thus the golf distancing system of the invention also accounts for this force 76, as discussed in connection with FIGS. 1B and 1C in the system's overall determination of distance from the golfer to the flag 74.

Further, although we do not notice the earth's rotation, this too applies a force 78 onto the golfer traversing the track 58. In one embodiment of the invention, therefore, distance calculations from the golfer to the flag 74 are compensated by the errors induced by the earth's rotation.

In accord with the invention, in order to track distance using the accelerometer-based golf distancing system on a golf course—such as when carried by an golfer along the track 58 of FIG. 2—the accelerations in the various axes should be known to determine an accurate distance measurement. In particular, the accelerations of gravity, translational motion, and angular motion must be known and compensated for; and accelerations relating to the rotation of the earth, and other accelerations should be compensated for.

In order to define the various axes, consider the movement of a car, which has three general motion axes: surge, sway and heave. When the car is moving straight ahead, it is moving in the surge direction. When a car slides from side to side, it is moving in the sway direction. And if the car were to leave the ground, during travel, and move into the air, it is moving in the heave direction.

There are also three general rotational dimensions, namely yaw, pitch and roll. Still utilizing the car example, when the car makes a left turn or a right turn, it is rotating in the yaw direction. When the car is going up or down hill, the car by necessity rotates in the pitch direction. Roll, as it sounds, concerns motions such as the car which rolls over.

In accord with the invention, the accelerometer-based golf distancing system incorporates both translational and angular accelerometers to determine certain surge, sway, heave, yaw, pitch, and roll accelerations to thereby determine distance remaining to the flag, or to other selected positional locations.

In particular, by double integration of the surge accelerations, the accelerometer-based golf distancing system of the invention provides distance; and by double integration of yaw accelerations, the system also provides heading. Keeping track of the instantaneous distance and heading information during movement along the golf path will determine a position on a map.

In order to determine accelerations due to translational motion in the surge direction, the pitch of the vehicle must be known so that accelerations due to gravity can be compensated for. For example, in FIG. 2, in order to compensate for the gravity force 76, an accelerometer which measures pitch is desired. Failure to measure the pitch acceleration will result in a very large error. For example, if a golfer carrying the accelerometer-based golf distancing system were to move up an incline of 10 degrees, the accelerations recorded by a translational accelerometer mounted in the surge direction would be $$\text{Distance error} = 0.5g \sin(10) \, t^2$$

where g (acceleration due to gravity) is 32 feet/s^2, and t (time in seconds). For a movement that takes 100 seconds (1000 feet per second) to traverse the 10 degree incline, the error would be on the order of 28,000 feet.

As for centripetal acceleration, a translational accelerometer, according to the invention, mounted in the surge direction will detect the centripetal acceleration component in the surge caused by an angular rotation of pitch and yaw. However, the radius of rotation for the centripetal acceleration component is dependent, in part, upon (i) the geometry of the vehicle, e.g., golf cart or golfer person, supporting the accelerometer-based golf distancing system, and (ii) the location of the accelerometers relative to one another and relative to the vehicle's rotational movement.

Roll will not significantly contribute to a centripetal component to the surge acceleration because the surge axis is coincident with the roll axis. Roll can, however, affect the pitch contribution of gravity forces but the effect is small because the effect is dependent upon the cosine of the roll angle (which in normal operation, including travel around the golf course, such an angle is typically small). More particularly, the acceleration due to gravity is equal to g times the sine of the pitch angle, times the cosine of the roll angle. Since the cosine of a small angle is about one, small variations in the roll angle will not contribute significantly to the acceleration component due to pitch. However, placing accelerometers on the axis allowed to move in the roll direction provides a mechanism to compensate for the roll accelerations.

It is well-known that acceleration forces are representable by vector mathematics. In accord with at least one embodiment of the invention, the acceleration forces are in fact stored and manipulated as vectors. In other embodiments of the invention, the acceleration forces are stored and manipulated as scalar quantities as will become clear below. The invention, in particular, provides three alternative measurement techniques to determine the distance to the golf flag, e.g., the flag 74 of FIG. 2.

Technique 1

In the first type of measurement, the distance traveled over time, e.g., the distance traveled by the golfer after tee-off is calculated by adding the acceleration vectors at each instant of time and then double integrating the acceleration vectors over time to determine the incremental distance traveled. The distance remaining, e.g., the distance from the golfer to the flag, is then the magnitude of the vector subtraction of the distance traveled from the total distance between the tee-off position and the flag.

Technique 2

Alternatively, each acceleration vector is double integrated over time and stored into the various incremental components of three-dimensional space, which are thereafter added together to determine distance traveled. The distance remaining, e.g., the distance from the golfer to the flag, is the magnitude of the vector subtraction of the distance traveled from the total distance.

Technique 3

In the third technique, the acceleration inputs are utilized only to locate a position on a map, which is representative of spatial information on the golf course. See for example, FIG. 7 and its associated commentary. Once the position is located on the map, a look-up table for each map is accessed to immediately determine the remaining distance to the flag.

Accordingly, the accelerometer-based golf distancing system according to the invention incorporates at least two rotational accelerometers and one translational accelerometer to compensate for the significant force of gravity during travel along the golf course. Such a system, in accord with the invention, also preferably compensates for other forces, e.g., centripetal acceleration, to more accurately determine distance measurement.

The determination and correction of the various acceleration forces affecting the system of the invention is facilitated by relatively complex vector mathematics, which is known to those skilled in the art.

Figure 3:
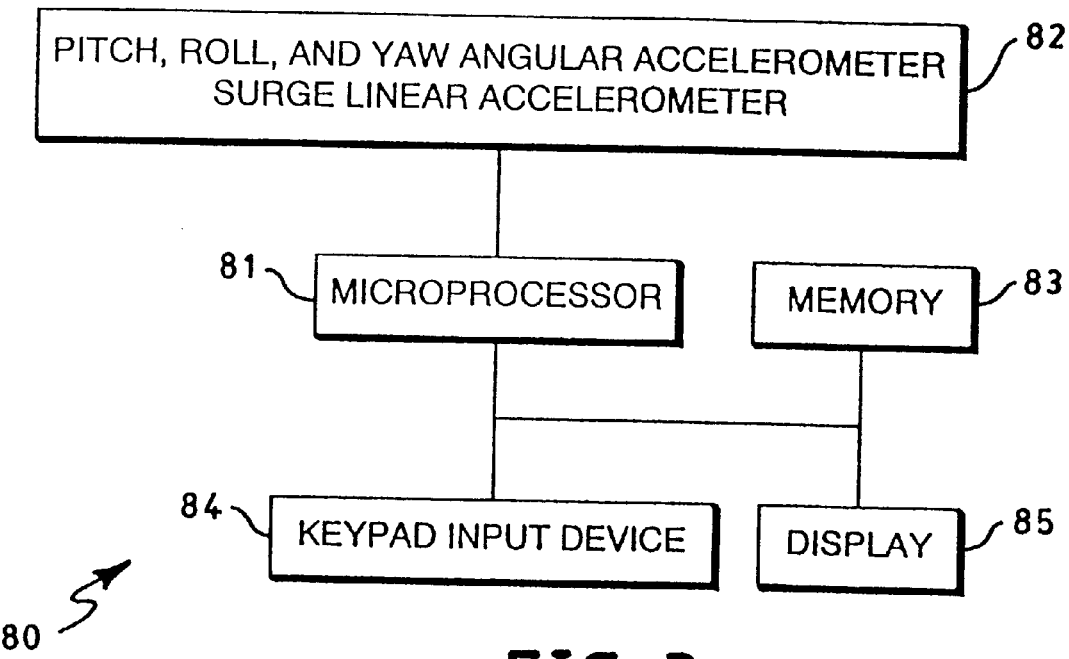
FIG. 3 shows a block diagram of an accelerometer-based golf distancing system according to one embodiment of the invention.

FIG. 3 shows a microprocessor system 80 constructed according to the invention. A microprocessor 81 receives inputs from a plurality of accelerometers 82 (such as pitch, roll, yaw, and surge accelerometers). A memory 83 stores digital information about the golf course so that distance can be determined (memory 83 also stores accumulated data from the processor). A keypad 84 accepts selected inputs from a user of the invention, for example to select the current hole being played so that the digital information about the hole is accessed from the memory 83. A display 85 shows the user the current distance to the hole being played, in addition to other information as set forth below.

The microprocessor 81 reads the outputs from the accelerometers 82 through an Analog to Digital Converter (A/D converter not shown) and stores these values in memory 83. The accelerations read through the accelerometers are as follows: the angular accelerations of $a_{roll}$, $a_{yaw}$, and $a_{pitch}$, and the linear acceleration of $a_{surge}$.

Angular velocities ω are then computed by the microprocessor as the time integrals of the angular accelerations:

$\omega_{roll} = a_{roll} dt$ where the limits of integration are between 0 and any time t.

$$\omega_{roll}(n) = \sum_{i=1}^{n} a_{roll}(i) * T$$

where T is sample interval and n is the present sample, while i through n is the history of samples.

$\omega_{pitch} = a_{pitch} dt$ where the limits of integration are between 0 and any time t.

$$\omega_{pitch}(n) = \sum_{i=1}^{n} a_{pitch}(i) * T$$

where T is sample interval and n is the present sample while i through n is the history of samples.

$\omega_{yaw} = a_{yaw} dt$ where the limits of integration are between 0 and any time t.

$$\omega_{yaw}(n) = \sum_{i=1}^{n} a_{yaw}(i) * T$$

where T is sample interval and n is the present sample while i through n is the history of samples.

The angular positions are then found by integrating the angular velocities:

$\theta_{roll} = \omega_{roll} dt$ where the limits of integration are between 0 and any time t.

$$\theta_{roll} = \sum_{i=1}^{n} \left[ 0.5 * a_{roll}(i) * T^{\wedge 2} + T * \sum_{m=1}^{i-1} a_{roll}(m) * T \right]$$

$\theta_{pitch} = \omega_{pitch} dt$ where the limits of integration are between 0 and any time t.

$$\theta_{pitch} = \sum_{i=1}^{n} \left[ 0.5 * a_{pitch}(i) * T^{\wedge 2} + T * \sum_{m=1}^{i-1} a_{pitch}(m) * T \right]$$

$\theta_{yaw} = \omega_{yaw} dt$ where the limits of integration are between 0 and any time t.

$$\theta_{yaw} = \sum_{i=1}^{n} \left[ 0.5 * a_{yaw}(i) * T^{\wedge 2} + T * \sum_{m=1}^{i-1} a_{yaw}(m) * T \right]$$

Surge accelerations are then corrected from the effects of gravity, centripetal accelerations, and earth rate:

$a_{surge\,true} = a_{surge}$ (measured)
$\quad g \sin(\theta_{pitch}) \cos(\theta_{roll})$ (Gravity)
$R_{pitch}(\omega_{pitch})^2$ (Pitch centripetal)
$(R_{yaw}(\omega_{yaw}))^2$ (Yaw centripetal)
Earth rate (calculated knowing North, East, and Latitude which is downloaded as an initial position).

Velocity along the Surge axis can then be calculated $V_{surge} = a_{surge\,true} dt$ where the limits of integration are between 0 and any time t.

$$V_{surge}(n) = \sum_{i=1}^{n} a_{surge\,true}(i) * T$$

Distance in the surge direction is then determined by integrating surge velocity:

$d_{surge} = V_{surge} dt$ $$d_{surge} = \sum_{i=1}^{n} \left[ 0.5 * a_{surge\,true}(i) * T^{\wedge 2} + T * \sum_{m=1}^{i-1} a_{surge\,true}(m) * T \right]$$

Surge is then transformed into any desired coordinate system. For example, Sin and Cos of the yaw angles will yield a X and Y coordinate system.

These integrations implemented in the microprocessor 81 are a series of additions from the samples made from the A/D converter. This results in incremental changes in distance along the surge direction. The surge direction changes with time as the system 80 turns (i.e., on a golf cart). The values of surge distance and Yaw angle are used moment by moment to keep track of where the cart is on a preloaded map of the course (stored in memory 83).

Figure 4:
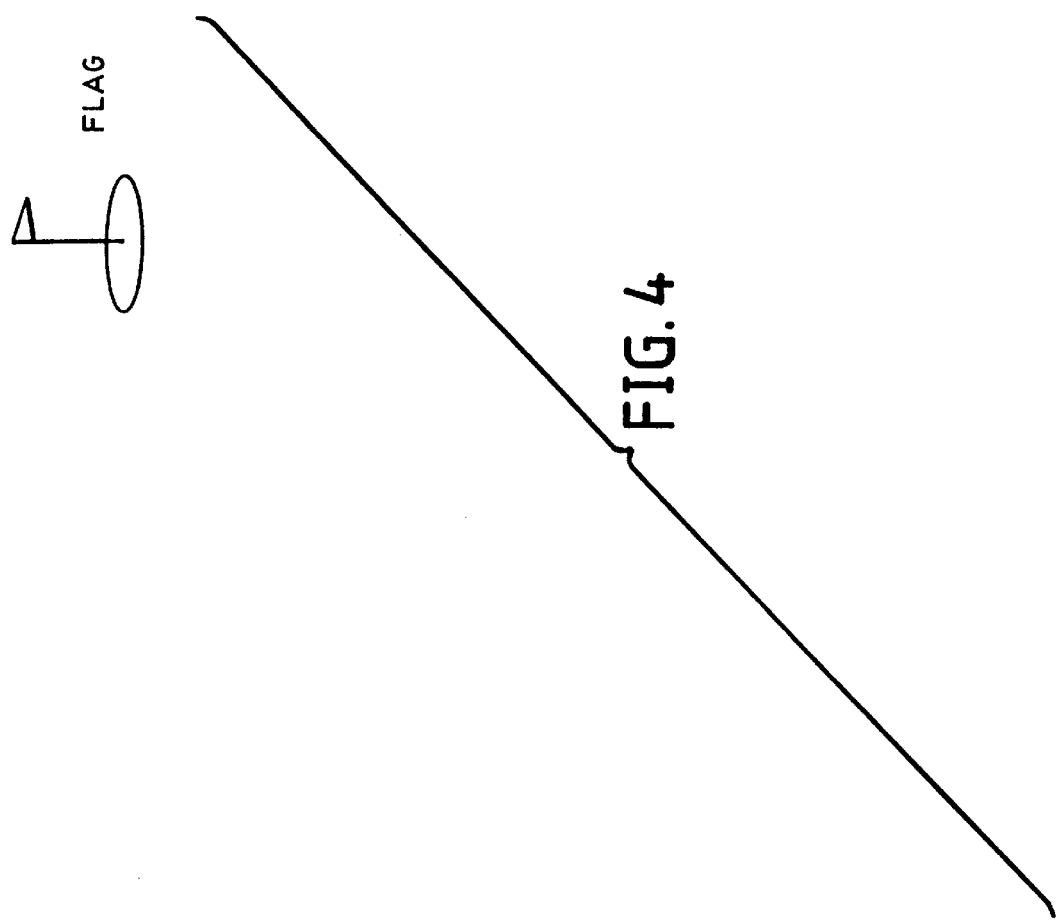
FIG. 4 exemplifies one example of a measurement with an accelerometer-based golf distancing system according to the invention.

FIG. 4 illustrates one example of this calculation, according to the invention. A golfer starts at a tee 85 and travels to Point P(x,y) on the fairway 87. At time t=0, the golfer steps on the GO pedal of the golf cart 86 and the cart accelerates to a velocity V. The microprocessor 81 samples the A/D output with a sample interval T and records acceleration samples (n) continuously. The microprocessor 81 keeps a running sum of the accelerations and integrates them digitally.

$\omega roll(n) = aroll(n)*T + \omega roll(n-1)$ $\omega pitch(n) = apitch(n)*T + \omega pitch(n-1)$ $\omega yaw(n) = ayaw(n)*T + \omega yaw(n-1)$ Centripetal outputs are continually generated given instantaneous angular velocity outputs by the given formulas.
$Acen(n) = Rpitch(\omega pitch(n))^{\wedge}2 + Ryaw(\omega yaw(n))^{\wedge}2$ where Rpitch and Ryaw are the radius of rotation from the center of rotation to the linear accelerometer.

Angular positions are then calculated by adding the angular velocity samples times the sample period to the previous angular position.

$\emptyset_{roll}(n) = \omega roll(n)*T + \emptyset_{roll}(n-1)\hat{\ }t$ $\emptyset_{pitch}(n) = \omega pitch(n)*T + \emptyset_{pitch}(n-1)\hat{\ }t$ $\emptyset_{yaw}(n) = \omega yaw(n)*T + \emptyset_{yaw}(n-1)\hat{\ }t$ Given angular position in space the effects of gravity and Earth Rate may be compensated.

$A_{gravity}(n) = g \sin(\emptyset_{pitch}(n)) \cos(\emptyset_{roll}(n))$

Earth rate is calculated by subtracting the component of earth rate coincident with the surge axis from the measured surge acceleration. The earth rate vector is a function of latitude. This vector can be expressed as an acceleration with a Pitch' and Yaw' angle relative to the local reference frame. The component projected onto the surge direction is the vector dot product determined by the cosine of the angle between the two vectors.

$A_{earth\,rate} = A_e \cos(\Omega)$ where Ae is the centripetal acceleration due to earth rate at the known latitude, and $\Omega$ is the angle formed by the earth rate vector and the vector formed by the surge direction.

The true surge acceleration is now determined by subtracting the centripetal, gravity and earth rate accelerations.

$A_{true\,surge}(n) = A_{surge\,measured}(n) - A_{cen}(n) - A_{gravity}(n) - A_{earth\,rate}$ Surge velocity is then calculated by adding True surge velocity with the previous sample:

$V_{surge}(n) = A_{true\,surge}(n) * T + V_{surge}(n-1)$

Once V surge is determined the position can be determined by integrating surge velocity broken down into its x and y components.

$P_x(n) = V_{surge(n)} \cos(\emptyset_{pitch(n)}) * T + Px(n-1)$ $P_y(n) = V_{surge(n)} \sin(\emptyset_{pitch(n)}) * T + P_y(n-1)$ The position on the course at any time is $$P_{(x,y)}(n) = P_x(n), P_y(n)$$

Where n is the current sample.

Figure 5:
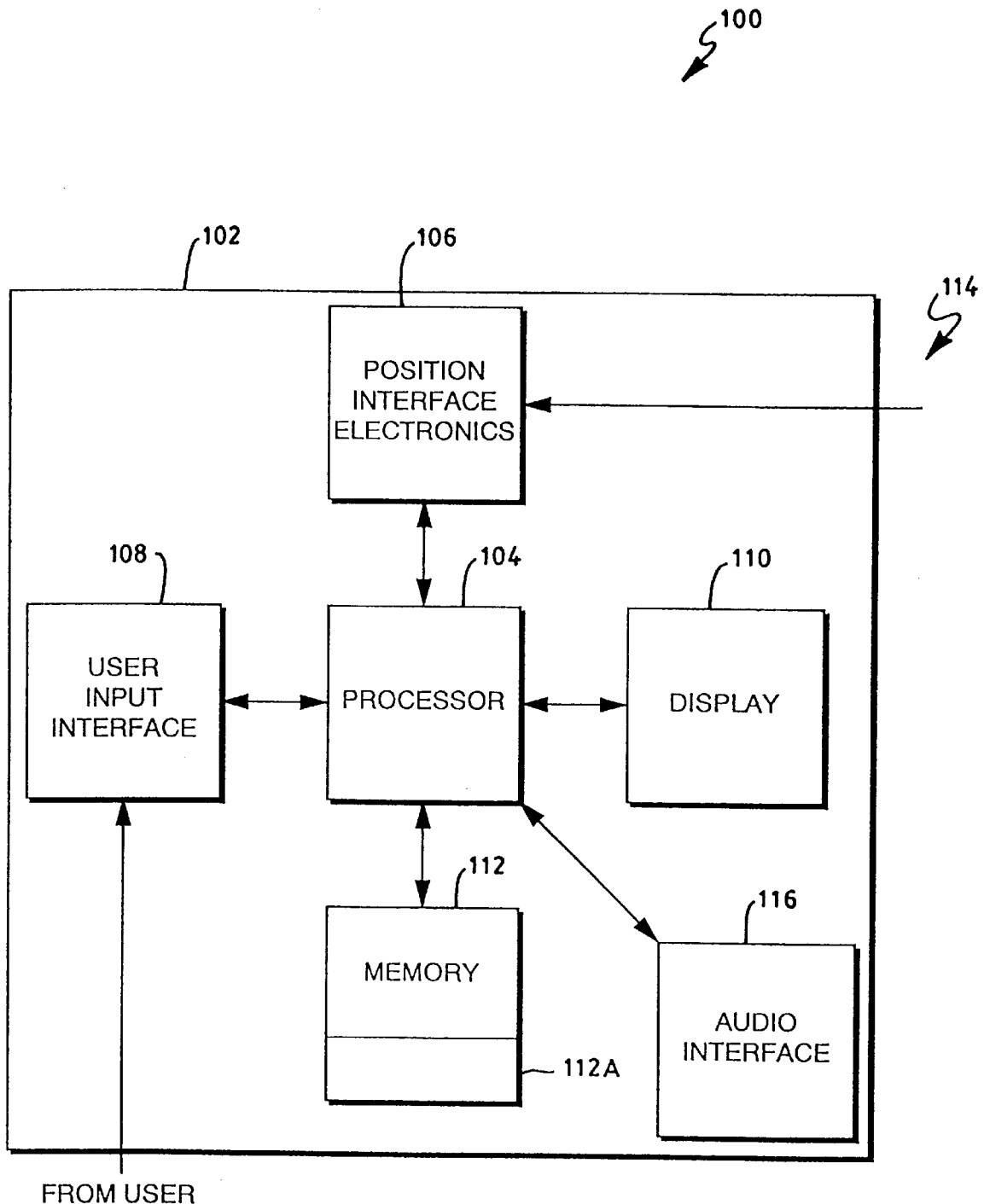
FIG. 5 shows a block diagram of an accelerometer-based golf distancing system according to one embodiment of the invention.

FIG. 5 shows a block diagram of a player positioning system 100 according to one embodiment of the invention. The illustrated embodiment 100 includes a mobile interface unit 102 that determines a player's position on a playing field from externally provided signals 112, and relays that positional information, along with other relevant information, to the player. According to a preferred embodiment, the unit 102 is kept in close proximity to the player, and includes a processor 104 (e.g., similar to the processor 81 of FIG. 3), position interface electronics 106, a user input interface 108, a display 110, and memory 112. The unit 102 can also optionally include an audio interface 116.

The position interface electronics 106 receives externally generated positional information signals 114. The signals 114 come from accelerometers, as described herein. Following initial processing of the signals 114, the interface electronics 106 then couples information gleaned from those signals to the processor 104.

The memory 112 can store, among other information, digitally encoded positional information, such as digitized maps, for one or more particular playing fields. Additionally, according to one embodiment, a portion 112a of the memory 112 can be removed and replaced with digitized maps of a plurality of playing fields. In this way, the system can be easily adapted for use at a variety of locals. The processor 104 determines a player's position on the playing field by correlating the positional information signals provided by the interface electronics 106 with the digitized map information stored in the memory 112. Once the processor 104 determines the players position, it can convey that information to the player by way of the display 110, or optionally by way of the audio interface 116.

Quite often players desire additional information besides their position. One sport where players desire such additional information is golf. The user interface 108, which by way of example can be a keyboard, enables golfers to query the processor 104 as to distance and performance related information. For instance, according to one embodiment, a golfer can request the distance to a particular flag, or to a hazard, such as sand trap, pond or tree. According to a further embodiment, golfers can request information regarding the distance between any two of a plurality of landmarks between the tee and the flag of a particular hole. The unit 102 provides the requested information by way of the display 110 or the audio interface 116.

Figure 6:
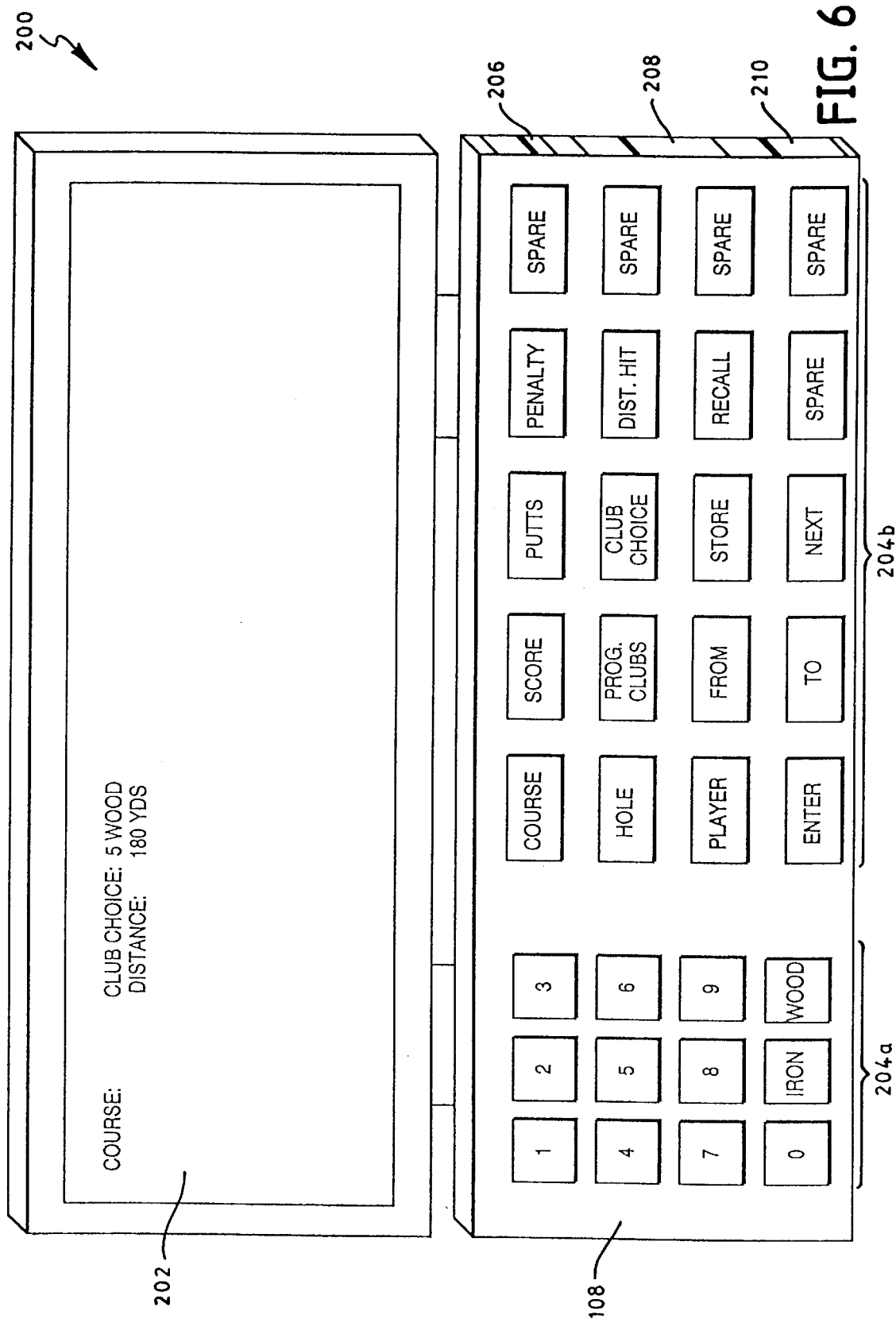
FIG. 6 depicts a mobile interface unit particularly adapted for operation on a golf course.
Figure 7:
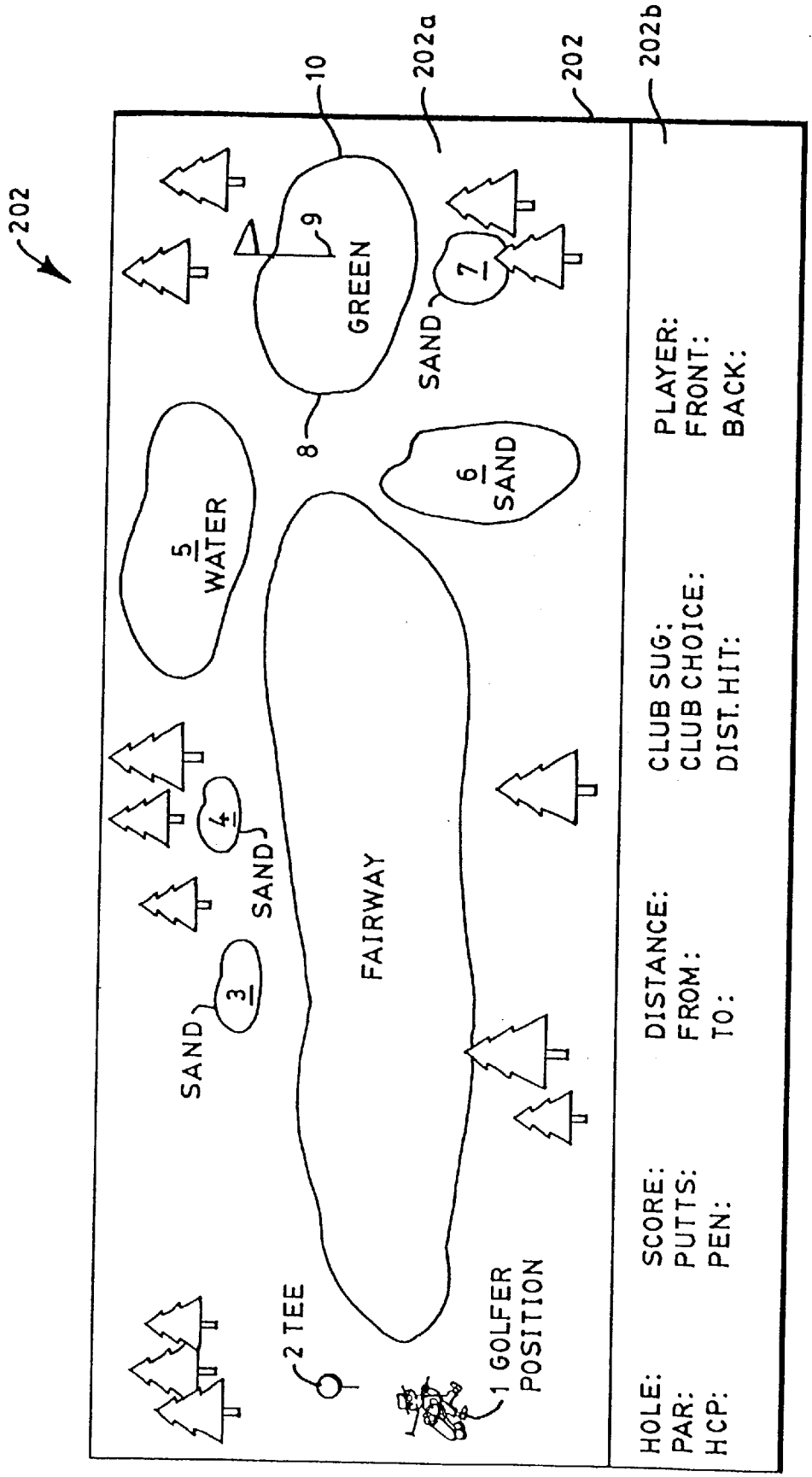
FIG. 7 shows one embodiment of the display portion of the mobile interface unit of FIG. 6.

FIG. 7, depicts an exemplary display 202 and keyboard interface for a mobile interface unit 200 of the type shown in FIG. 6, but particularly adapted for operation on a golf course. The display 202 includes a graphical display portion 202a and an alphanumeric display portion 202b. The keyboard includes keys that can be generally grouped as command keys 204a and keys that can be grouped as numerical keys 204b.

During operation, a player can optionally perform a variety of initialization procedures to ready the mobile unit 200 for operation. First, the player can enter a numerical code which designates the particular golf course to be played. The golfer accomplishes this by actuating the "COURSE" command key followed by actuating the numerical keys corresponding to the desired course. In response, the processor 104 accesses the map for the selected course from the memory 112, and the display 200 shows the selected course code in the "COURSE:" field. According to alternative embodiments, the golfer can change memory modules to provide the appropriate course map or can receive a signal from the club house that automatically sets the appropriate course selection code. According to a further embodiment, particular golf courses can provide mobile interface units 200 to the golfers, in which case the course can preset the appropriate course code before time. Where the golf course provides either the memory modules or the entire unit 200, up to date topography changes in the course can be incorporated into the digitized memory map. This can be easily accomplished via a central base computer located in the club house.

The golfer can program into the memory the distance that he or she normally hits a golf ball with each club or any subset of their golf clubs. To enter the program clubs mode, the golfer actuates the "PROGRAM CLUBS" command key. Next, the golfer actuates the "CLUB CHOICE" command key, followed by the numerical designation of the club to be set. By way of example, to select the five wood, the golfer actuates the "WOOD" key, followed by the "5" key. In response, the display 202b indicates a "5W" in the "CLUB CHOICE:" field. Next, the golfer actuates the "DISTANCE" command key followed by the numerical keys corresponding to the desired distance. The display 202b then shows the selected distance in the "DISTANCE:" field. To program distances for additional clubs, the golfer repeats the "CLUB CHOICE" and "DISTANCE" portions of the above sequence of commands or alternatively, to program the next club in sequence, the golfer can actuate the "NEXT" command key. To exit this mode of operation, the golfer simply actuates the "ENTER" command key. If a golfer chooses not to program club distances, the unit 200 can use a default set of parameters. Using the above described procedure, a golfer can alter any or all of the default distance parameters.

Next, the golfer can select the hole to be played. This is accomplished by actuating the "HOLE" command key followed by actuating the numerical designation for the hole (e.g., 01, 02, . . . , 18). In response, the display 202b indicates the designation for the selected hole in the "HOLE:" field. Alternatively, as a golfer approaches the tee for a particular hole, the unit 200 can receive a signal that automatically programs the hole to be played. Additionally, in response to receiving the hole designation, the processor 104 accesses map information stored in memory 112 and transmits this information to the display 200. The display 200 provides a graphical representation of the selected hole in field 202a. As can be seen from the illustrative hole shown in field 202a, all significant features of the hole being played, including the tee, the green and various landmarks and hazards can be displayed. Additionally, the processor correlates the position information provided by the position interface electronics 106 with the map information provided by the memory 112 to determine the position of the mobile unit 200 on the golf course. The golfer's position is illustrated on the display 202a by the character at 1.

As the golfer plays each hole, the mobile unit 200 can provide considerable information. For example, according to one preferred embodiment, the unit 200 automatically displays the distance from the mobile unit 200 to the flag. By request, the unit 200 can also provide a golfer with the distance from the mobile unit 200 to any of the landmarks shown in the graphical display 202a. To determine such distances, the golfer actuates the "TO" command key, followed by the numerical designation for the landmark. In response, the unit 200 displays the landmark designation in the "TO:" field and the requested distance in the "DISTANCE:" field of display 202*a*. According to a further embodiment, the unit 200 can also provide a golfer with the distance between any two of the landmarks shown in the graphical display 202*a*. To determine such distances, the golfer actuates the "FROM" command key, followed by the numerical reference designation of the first landmark of interest. In response, the display 202*b* indicates the selected reference designation in the "FROM:" field. Next, the golfer actuates the "TO" command key followed by the numerical reference designation for the second landmark of interest. In response, the display 202*b* shows that reference designation in the "TO:" field. The processor 104 then accesses the map information in the memory 112, calculates the distance between the two selected reference designations, and couples the calculated distance to the display 202*b*. The display 202*b* then indicates this distance information to the golfer in the "DISTANCE:" field. To reenter the mode of automatically displaying the distance between the mobile unit 200 and the flag 9, the golfer simply actuates the "TO" command key, followed by the reference designation "1."

The processor can also automatically accesses the club distance information (either the default parameters or those previously programmed by the golfer, as may be appropriate) and displays a club suggestion for each shot. The display 202*b* indicates the club suggestion for each shot in the "CLUB SUGGESTION:" field.

The mobile unit 200 can also provide the golfer with a convenient system for keeping score. Following the completion of a hole, the golfer can actuate the "SCORE" command key followed by the score for that hole. The processor 104 updates the golfer's score and transmits the updated score to the display 202*a*. The display 202*a* in turn displays the score for the hole just played in the "SCORE:" field and also displays the updated total score in either the "BACK NINE:" or "FRONT NINE:" fields, as appropriate.

The mobile unit 200 can also provide a golfer the with the option of recording additional performance related information for each hole played. This performance can be stored in the memory 112, and optionally recalled for examination later. This feature can be very useful for educational purposes, and eliminates the need for keeping inconvenient notes. By way of example, once selecting a club, but prior to taking a shot, a golfer can actuate the "CLUB CHOICE" command key, followed by the "STORE" command key. This will automatically, store the displayed club choice, distance, course and hole information, and golfer position information for the particular hole. If the golfer repeats this procedure for each shot taken on the hole, a complete record of play on that whole will be stored. To recall this information at a later time, the golfer actuates the "RECALL" command key, and then specifies the course and hole of interest. To review successive shots, beginning at a particular hole, the golfer actuates the "NEXT" command key. In this way golfers can review their play on troublesome holes, and learn to avoid repeatedly making the same mistakes, such as incorrect club selection for particular shots.

Optionally, the golfer can down load information regarding the round of golf to a central computer located in the club house. To down load such information, the golfer simply provides the course operator with the his removable memory module. The central computer can access the memory module, store the data, and process and print the data in any number of formats, depending on the personal preference of the golfer.

While the above description addresses various features of the present invention, those skilled in the art will appreciate that the description of the particular implementation of those features, such as the particular command keys included and their arrangement, along with the particular layout of display is simply illustrative in nature. By way of example, the display 202*b* depicts various information being displayed simultaneously. However, according to other embodiments, information can be displayed as sequence of user interface dialogs, employing a tool bar and various menus, and being initiated by a golfer actuating a particular command key. In this way, the display can be made smaller, and the number of command keys can be reduced. Alternatively, as the golfer moves to different positions along a fairway, the display can be automatically updated to provide a more detailed display of the relevant area of play. Also, the alphanumeric display 202*b* can be integrated with the graphical display 202*a*, to further conserve on display space. Further, additional information can be provided on the display, such as the par and handicap rating for the hole. Also, additional information can be recorded by the unit 200, such as the number of penalty strokes taken and the number of putts required, and the actual distance that the golfer hits each club during play.

As in any electronic system, the information that can be conveniently received from and conveyed to a user is at least in part dependent on the size of the system and the power consumed by the system. Consequently, as the unit 200 is made larger, more of the above described features can be included and the display can be more detailed. According to one preferred embodiment, the mobile unit 200 can be mounted to a drivable golf cart. According to a further embodiment, the drivable golf cart can provide the power required by the unit 200, thus enabling the unit 200 to include a relatively detailed display 202 and a significant number of features such as described above. According to another embodiment, the unit 200 can be adapted to be either hand held or mounted to a pull-type golf cart. To provide for lower power consumption and convenience of size, the hand held and pull-type golf cart embodiments can be essentially paired down versions of the embodiment of FIG. 6.

FIG. 8 shows a portable display unit 300, particularly adapted for operation as a hand held unit or for mounting on a pull-type golf cart. As can be seen, the unit 300 includes a display 302 and a keypad interface 304. Like the unit 200 of FIG. 6, the keypad interface 302 includes a command keys 304*a* and numeric keys 304*b*. According to the depicted embodiment, the display 302 only includes alpha numeric capabilities. However, according to other embodiments, a small graphical display portion, such as those employed on hand held video games can be incorporated. In the case where a graphical display is used, the unit 300 operates essentially identically to unit 200 of FIG. 6. In the event that no graphics capability is included, a small hard copy map can be included to provide the reference designations for the landmarks that are located along the golf course. Alternatively, the unit 300 can be programmed to only provide the distance between the mobile unit 300 and the flag for the hole being played. In one low power display 304*c* of the invention, FIG. 8A, a simple LCD shows only the distance to the flag for the given hole.

As mentioned above, the positional information that the mobile unit processes to provide distance and other related information to a player is derived from accelerometers.

Figure 11:
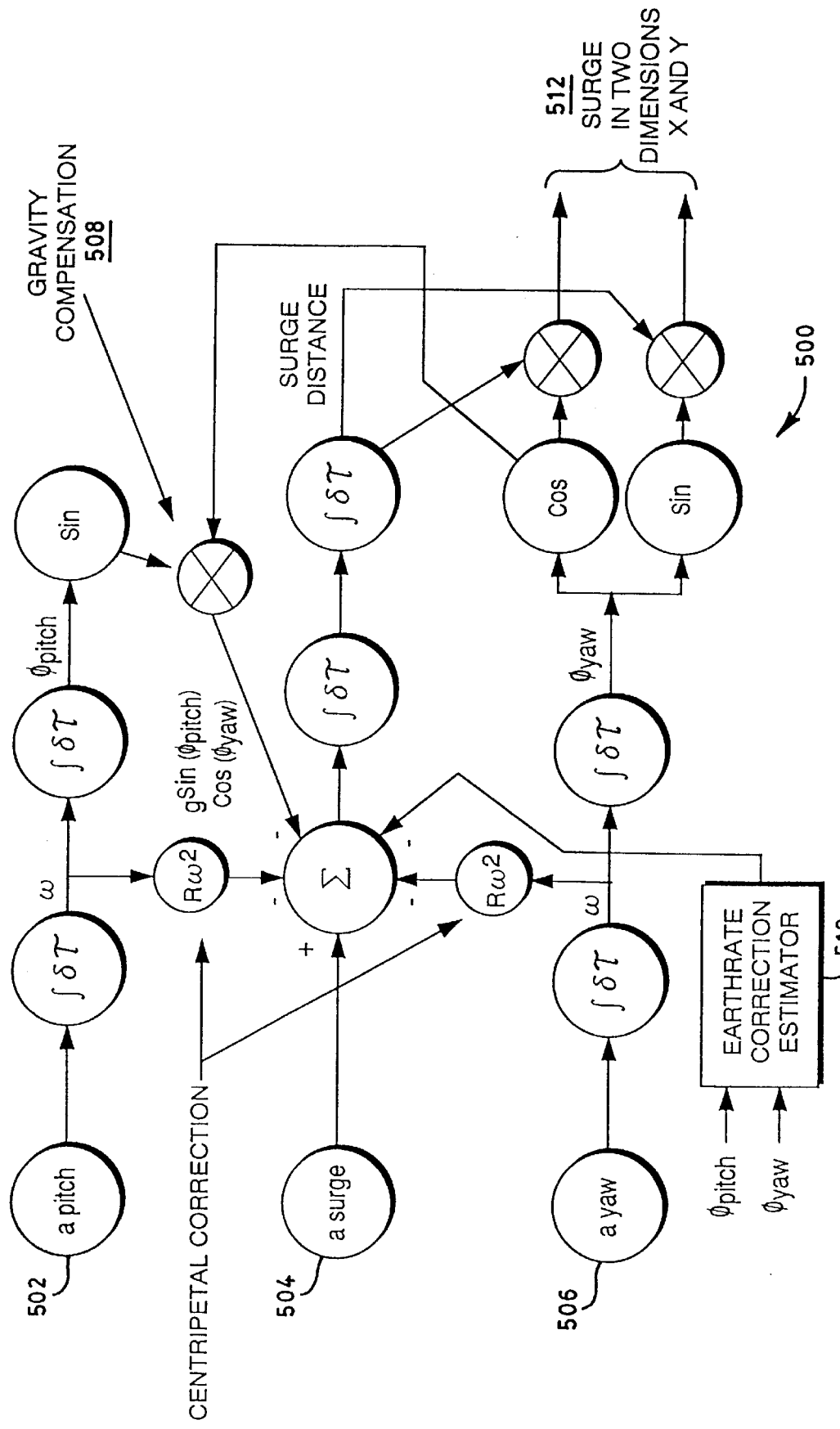
FIG. 11 shows calculation methodology for determining distance via a golf distancing system constructed according to the invention.

FIG. 11 shows a flow chart 500, in accord with the invention, for determining accelerations during play on a golf course and compensating those accelerations for forces such as gravity and centripetal acceleration. Specifically, inputs of pitch 502, surge 504, and yaw 506 are input together with information 508 relating to gravity and information 510 relating to earth rate correction. The several inputs are combined to define a surge 512 in X,Y, which directly correlates to distance traveled.

It is accordingly intended that all matter contained in the above description or shown in the accompanying drawings be interpreted as illustrative rather than in a limiting sense.

It is also intended that the following claims cover all of the generic and specific features of the invention as described herein, and all statements of the scope of the invention which, as a matter of language, might be said to fall there between.

Having described the invention, what is claimed as new and secured by Letters Patent is:

1. A portable distance tracking system for mounting on a cart that travels on a playing field having at least one landmark, comprising:

A. a memory element including means for storing a digital representation of the playing field, the digital representation having digitally encoded positional information defining the landmark relative to other positions within the field;

B. accelerometer means, including at least two rotational accelerometers and a translational accelerometer, for determining translational and rotational accelerations and for generating data representative of the accelerations;

C. a data processor, coupled to the memory element and to the accelerometer means, including means for (i) compensating the data for gravitational acceleration forces by determining a pitch angle of the cart, (ii) integrating the compensated acceleration to determine a distance traveled on the field relative to an initial position, (iii) determining a position on the field from the distance traveled, and (iv) correlating the position to the positional information within the memory element to determine the distance to the landmark as a function of the position; and D. a display, coupled to the data processor, including means for displaying the distance to the player.

2. A portable distance tracking system according to claim 1 wherein the playing field includes a plurality of landmarks and the data processor includes means for determining a distance between any of the plurality of landmarks and the position.

3. A portable distance tracking system according to claim 1, further comprising a keyboard interface, coupled to the data processor, and including means for enabling a player to interactively interface with the system.

4. A portable distance tracking system according to claim 1 wherein the data processor further comprises means for compensating the accelerations for at least one of: (i) forces due to centripetal acceleration and (ii) forces due to a rotation of the earth.

5. A portable distance tracking system according to claim 1 wherein the memory element includes a replaceable portion, the replaceable portion being capable of storing digital representations of a plurality of playing fields.

6. A portable distance tracking device for calculating the distance to a flag from a first position on a hole of a golf course, comprising:

initialization means for initializing the device at a starting position of the hole;

two rotational accelerometers, to measure acceleration along pitch and roll axes, and a translational accelerometer, to measure acceleration along a surge axis;

microprocessor means, including an A-D converter, for (i) converting the accelerations to digital data, (ii) integrating the data twice, over time, to determine distance traveled on the hole, the data being compensated by the microprocessor for forces due to at least one of gravity, centripetal acceleration, and a rotation of earth, (iii) determining a pitch angle of the device, and (iv) determining distance to the flag as a function of the distance traveled;

a keypad input device for selecting the initialization means and for selecting the hole;

a memory element including means for storing a digital representation of said hole; and a display unit for displaying the distance to the flag.

7. A method for tracking distance on cart moving on a playing field, wherein the field comprises at least one landmark, comprising the steps of:

storing a digital representation of the playing field in memory, the digital representation having digitally encoded positional information defining the landmark relative to other positions within the field;

determining translational and rotational accelerations and generating data representative of the accelerations;

compensating the data for gravitational acceleration forces by determining a pitch angle of the cart;

integrating the compensated acceleration to determine a distance traveled on the field relative to an initial position;

determining a position on the field from the distance traveled; and correlating the position to the positional information within the memory element to determine the distance to the landmark as a function of the position.

* * * * *